(No Model.) 2 Sheets—Sheet 2.
J. M. HESS.
ADJUSTABLE BACK REST FOR BICYCLE SEATS.
No. 592,783. Patented Nov. 2, 1897.
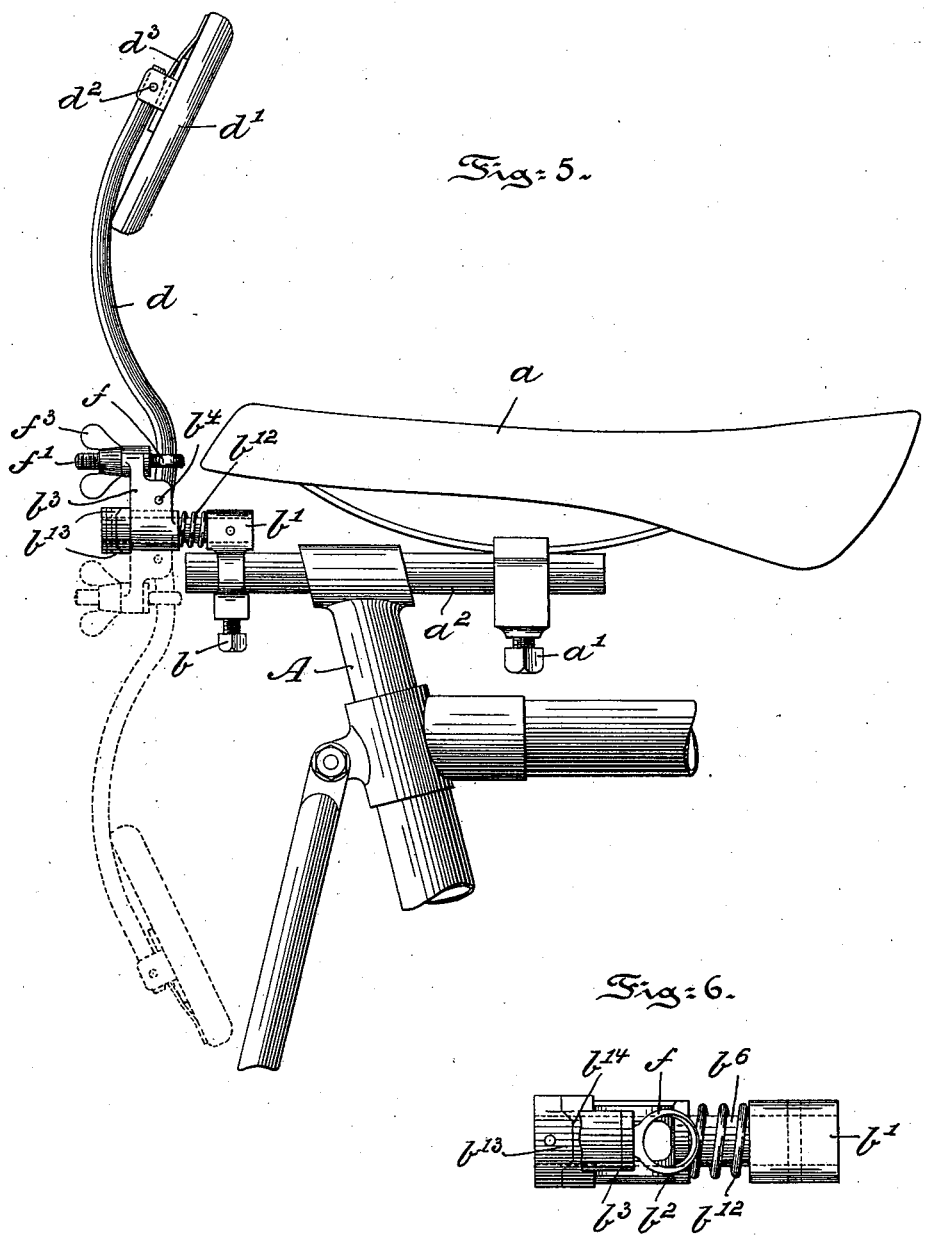
Witnesses:
Thomas M. Smith
Richard C. Maxwell
Inventor:
John M. Hess,
By J. Walter Douglass
Attorney.

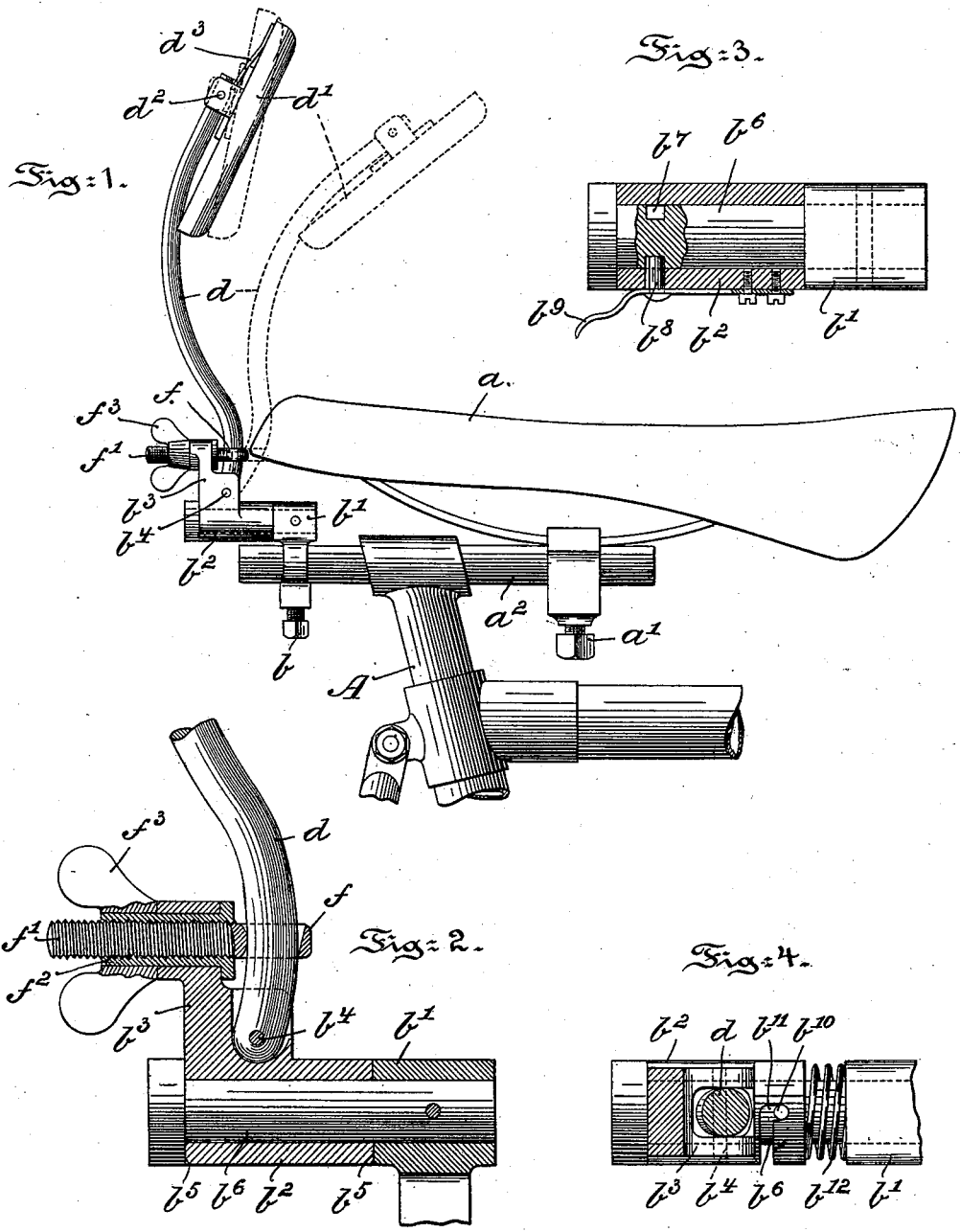

UNITED STATES PATENT OFFICE.

JOHN M. HESS, OF PHILADELPHIA, PENNSYLVANIA.

ADJUSTABLE BACK-REST FOR BICYCLE-SEATS.

SPECIFICATION forming part of Letters Patent No. 592,783, dated November 2, 1897.

Application filed September 1, 1896. Serial No. 604,511. (No model.)

*To all whom it may concern:*

Be it known that I, JOHN M. HESS, a citizen of the United States, residing at the city of Philadelphia, in the county of Philadelphia and State of Pennsylvania, have invented certain new and useful Improvements in Adjustable Back-Rests for Bicycle-Seats, of which the following is a specification.

My invention has relation to a back-rest for bicycle-seats adapted to be adjusted so as suit conditions of the rider seated upon the saddle of the vehicle and also adapted to be arranged so as to be thrown out of the way of the rider when required, as in mounting the vehicle.

The principal objects of my invention are, first, to provide a simple, durable, and effective rest for the back of the rider of a bicycle or similar vehicle; second, to provide a back-rest for the rider of a bicycle or similar vehicle which is adjustably connected with the saddle-support and adapted to be thrown out of the way in mounting the vehicle or when required, and, third, to provide a bicycle-saddle back-rest adjustably supported adjacent thereto, so as to be readily brought into a position to adapt it to the requirements of the rider seated upon the saddle and to be thrown out of the way of the saddle when not required by the rider, and to provide the back-rest with simple means whereby the adjustability of the rest or freeing of the same from its normal or operative position may be readily accomplished.

My invention consists of a back-rest for the rider of a bicycle or similar vehicle constructed and arranged in substantially the manner hereinafter described and claimed.

The nature and scope of my invention will be more fully understood from the following description, taken in connection with the accompanying drawings, forming part hereof, in which—

Figure 1 is a side elevational view of a supported saddle on a bicycle or similar vehicle, with the adjustable back-rest of my invention in one form thereof shown in application to said support for the saddle and located adjacent to the latter element of the vehicle. Fig. 2 is a view, enlarged, partly in central section and partly in side elevation, of the form of the adjustable back-rest with its accessories of Fig. 1. Fig. 3 is a view, partly in longitudinal section and partly in plan, of a modified form of a device adapted to be connected with the adjustable back-rest of my invention for permitting of the same being thrown out of the way of the saddle when required, as in mounting the saddle. Fig. 4 is a top or plan view of a still further modified form of device for shifting the back-rest of Fig. 1 in a downward direction. Fig. 5 is a side elevational view of a still further modified form of the device for use, in conjunction with the adjustable back-rest, for throwing the same out of the way of the saddle, as indicated in dotted outline, to permit of the free mounting of the saddle; and Fig. 6 is a top or plan view, enlarged and partly broken away, of that form of device illustrated in Fig. 5 for permitting the back-rest to be thrown down out of the way of the rider.

Referring to the drawings, A is a saddle-support of any suitable construction.

$a$ is the saddle, secured by a set-screw $a'$ to the arm $a^2$, held in the support A in any suitable manner. At the rear end of the arm $a^2$ is secured by means of a set-screw $b$ a bracket $b'$, to which is secured in a manner to be hereinafter more fully described a sleeve $b^2$, having a projection or ear $b^3$. Pivoted, as at $b^4$, in the ear $b^3$ is a curved standard $d$, carrying at its upper end a pad-like rest-piece $d'$, preferably pivoted, as at $d^2$, and held to required position or angle under the influence of a flat spring $d^3$, which permits the rest-piece $d'$ to move upon its pivotal support under the pressure of the back of the rider to accommodate the rest-piece to the back, as indicated in full and dotted lines in Fig. 1.

Above the pivotal point $b^4$ the lower end of the curved standard $d$ is inclosed by an eye $f$ of a screw-bolt $f'$, passing through the upper end of the ear $b^3$. The screw end of bolt $f'$ is inclosed in a sleeve $f^2$, screw-threaded on its interior and adapted to be rotated in the ear $b^3$ by means of a thumb-nut $f^3$. The sleeve $f^2$, while free to rotate in the ear $b^3$, is confined thereto, so that it cannot move laterally, and the rotary movement of the sleeve $f^2$ serves to advance or retract the bolt $f'$, its eye $f$, and the standard $d$, as indicated in dotted and full lines in Fig. 1 of the drawings.

When the back-rest $d'$ is not in use, it may be turned or thrown down into the position indicated in dotted lines in Fig. 5. In order to accomplish this, the sleeve $b^2$ is adapted to swing in the bracket $b'$ and is also adapted to be locked thereto in one of the several ways illustrated in the drawings. Thus in Fig. 2 the sleeve $b'$ impinges by frictional contact against the ends $b^5$ of the bracket and can only turn by exerting force against the standard $d$. In Fig. 3 the shaft $b^6$ of the bracket $b'$, upon which the sleeve $b^2$ rotates, is provided with one or more holes $b^7$ for the reception of a locking-pin $b^8$, penetrating the sleeve $b^2$ and held downward therein by means of a spring $b^9$. By releasing the pin $b^8$ the sleeve $b^2$ may be turned to required position, at which position the pin will enter one of the holes $b^7$, to thus lock the same to the shaft of the bracket in either operative or inoperative position. Again, in Fig. 4 the shaft $b^6$ of bracket $b^2$ is provided with a pin $b^{10}$, entering a slot $b^{11}$ of the sleeve $b^2$, the pin and slot forming what is known as a "bayonet" connection. The sleeve $b^2$ is pressed into locked position by means of the spring $b^{12}$.

In Figs. 5 and 6 the bracket $b'$ and the sleeve $b^2$ at contiguous portions are fitted with cam-like locking projections $b^{13}$ and corresponding depressions $b^{14}$, and the sleeve is normally pressed into locked position by means of the spring $b^{12}$.

The back-rest above described is simple in construction, easily adjusted to the saddle, and the rest-piece may be quickly adjusted to the back of the rider. The rest when not in use can be readily and quickly dropped downward below the saddle and away therefrom to permit of the free mounting of the same.

Having thus described the nature and objects of my invention, what I claim as new, and desire to secure by Letters Patent, is—

1. In a back-rest for bicycles or the like, a supporting-arm for the saddle, a bracket adapted to be secured to said arm, a sleeve adapted to rotate in said bracket and provided with a projection or ear, a curved standard pivoted at one end to said projection or ear, a rest-pad pivoted to the free end of said standard, and an eyebolt adapted to be advanced and retracted in said ear, said standard passing through the eye of said bolt, substantially as and for the purposes described.

2. In a back-rest for bicycles or the like, a supporting-arm for the saddle, a bracket adapted to be secured to said arm, a standard pivoted in said bracket and adapted to be rotated in connection therewith, and an eyebolt surrounding the lower end of said standard and adapted to be adjusted longitudinally in said bracket, substantially as and for the purposes described.

In testimony whereof I have hereunto set my signature in the presence of two subscribing witnesses.

JOHN M. HESS.

Witnesses:
J. WALTER DOUGLASS,
RICHARD C. MAXWELL.